Patented Nov. 17, 1925.

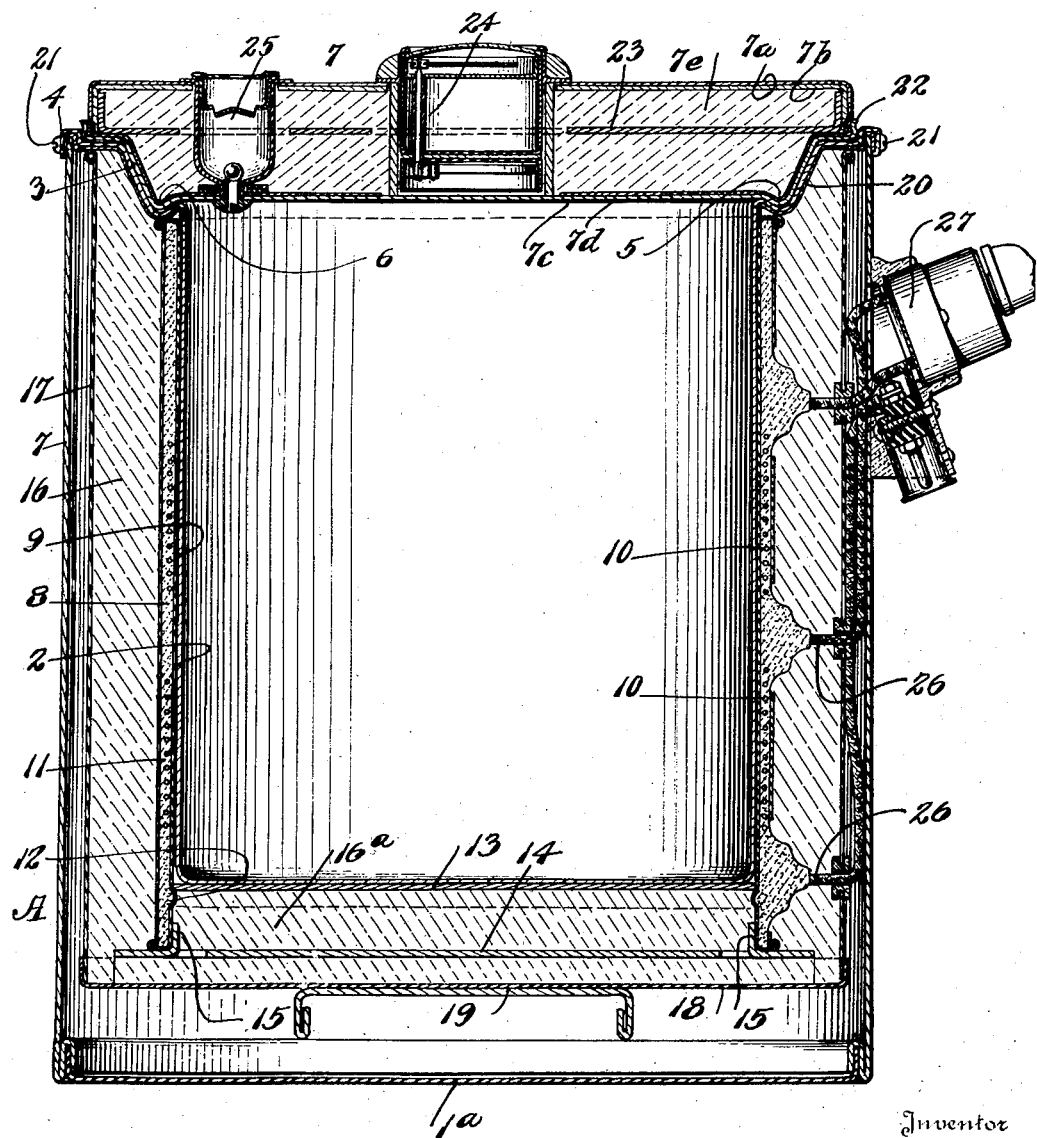

1,562,021

UNITED STATES PATENT OFFICE.

HENRY A. ZIOLA, OF TOLEDO, OHIO, ASSIGNOR TO THE SWARTZBAUGH MANUFACTURING COMPANY, OF TOLEDO, OHIO, A CORPORATION.

ELECTRIC COOKER.

Application filed March 28, 1925. Serial No. 19,024.

*To all whom it may concern:*

Be it known that I, HENRY A. ZIOLA, a citizen of Austria, residing at Toledo, in the county of Lucas and State of Ohio, have invented certain new and useful Improvements in Electric Cookers, of which the following is a specification.

This invention has to do with what are commonly known as fireless cookers, and embodies an improved construction of electric cooker operating much on the same principle as the known types of fireless cookers, excepting that the heat unit employed is one of the self-contained electric resistance wire type.

The main objects which I have had in view and achieved in the development of my particular construction of cooker herein presented include provisions for a general simplification of the body construction of the heating appliance. Moreover, I have designed the body so that the cooking well thereof, is rendered specially substantial by the reinforcing of the same through the use of a backing of sheet steel. This well is ordinarily made of aluminum for well known reasons and unless reinforced tends to become mis-shapen in the ordinary usage of the cooker.

Still another object of my invention has been to provide a novel assemblage of the various parts of the cooker body such that should the occasion arise certain parts may be separated for purposes of repair or accessibility, the assembling means for holding the parts in proper relations being detachable.

Still another object of the invention has been the provision of a novel form of heating unit arranged in a peculiar manner in respect to the cooking well, whereby a high degree of efficiency of heating, in relation to the cooking compartment is obtained, whereby the cooking unit itself is thoroughly protected against liability of damage or injury by steam or fumes that may be generated in the cooking well, and whereby said unit is rendered substantially as long lived as the cooker body itself, being susceptible at the same time of ready assemblage with the other parts of the device.

A full understanding of the invention, including its merits and advantages to practical conditions of service, will be had upon reference to the accompanying drawing in which:

The figure is a vertical, longitudinal sectional view of a cooker incorporating the novel features of the structure of my invention.

Referring to the drawings I have illustrated my cooker in its most simplified form of body construction, but it is to be understood that the body generally designated at "A" may be supported by short feet, or if desired, by long legs. It is furthermore to be understood that the construction illustrated may be characterized as a single unit type of body though the outer casing may be made sufficiently large to contain two or three cooking compartments or wells in accordance with common practice in the art of manufacture of cooking appliances of the nature of my invention. The extension of the sides of the cooker from a single compartment or unit construction involves primarily the mere duplication to greater or less extent of the features of construction now to be described.

The cooker body "A" comprises an outer casing 1, which may be of any suitable metal, preferably sheet steel, and may be round, square or of any other general shape desired, within the purview of my invention. Within the casing 1 is disposed in a centralized position the cooking well or compartment 2, which is preferably made of aluminum, a metal that has been found very suitable for cooker construction purposes, having in view the cooking function of the appliance. The cooking well 2 is provided at its upper end with a downwardly, upwardly and horizontally extending flange 3 at the outermost portion of which is formed a rim 4 of somewhat "U-shaped" cross section, this rim is adapted to receive the upper edge of the casing 1. The flange portion 3 of the well or compartment 2, by reason of the formation above mentioned provides a groove 5 at the mouth of the well in which an annular protuberance 6 on the bottom of the cover 7 is adapted to fit.

Surrounding the well 2 is the heating unit 8 which is of a specially designed construction which of itself seems the subject matter of my pending application for patent executed February 14 and February 27, 1925. Said heating unit however, peculiarly cooperates with the cooking well construction of this invention in that the unit comprises a metal cylinder 9 preferably of much greater strength than the aluminum well itself. This cylinder 9 is in snug fitting contact with the outer surface of the well 2 and constitutes a metal backing element therefor.

The heating unit 8 may be generally described as including a body comprising asbestos directly surrounding the cylinder 9 and covered by an impregnating compound and special cement composition in which the resistance wires 10 are imbedded. Said composition in which the resistance wires 10 are carried, may or may not be provided with an exterior or covering cylinder 11, separated from the composition aforesaid by asbestos and suitable impregnation by a special chemical compound that forms the feature of my pending application hereinbefore referred to. It is notable however that without using the cylinder 11, the cylinder 9 and the composition surrounding it with the wires 10 imbedded therein, constitutes a suitable heating unit of itself. Where two cylinders 9 and 11 are employed, somewhat greater rigidity is obtained and in some constructions of cookers this advantageous arrangement. The lower portion of the flange 3 of the well 2 is adapted to rest upon the top of the heating unit, the cylinder 9 having flange $9^a$ projecting outwardly therefrom and rolled upon the cylinder 11 if the latter is employed. I preferably utilize Monel metal or other metal which does not oxidize at high temperatures in making the heating unit cylinders 9 and 11. Near the lower end the cylinder 9 is formed with an annular inwardly extending rib 12 on which is carried a reinforcing base plate 13, which contacts with the bottom of the well 2 and braces it. The lower end of the cylinder 9 is formed the same as its top for cooperation with the cylinder 11 and the heating unit is carried upon a supporting plate 14, which is provided with upwardly projecting lugs 15 engaged in the cylinder 9, and thereby centralizing the same upon the member 14. Surrounding the heating unit and the well 2 within said unit is a suitable quantity of thermal insulation 16 which may be mineral wool or any suitable substance of a corresponding nature. The said insulation 16 is disposed between the heating unit and an auxiliary casing 17, disposed in the casing 1 and spaced from the latter. The auxiliary casing 17 has a bottom 18 spaced from the bottom $1^a$ of the casing 1 and the casing 17 is supported upon a "U-shaped" cross plate 19, disposed thereneath and suitably secured at opposite ends to the casing 1. Between the base plate 13 and at the bottom of the well 2 and the bottom 18 of the auxiliary casing 17 is the thermal insulation $16^a$ which virtually forms a continuation of the insulation 16 that surrounds the well 2 and heating unit. In order to brace or reinforce the flange 3 at the top of the well 2, I employ a special plate 20 which extends from the top of the heating unit cylinder 9 beneath the flange 3 and is formed with a "U-shaped" rim beneath the rim 4. In other words, the reinforcing plate 20 which is of stout metal such as steel is shaped like the flange 3 with its rim 4 and engaged with the upper end of casing 1 so as to firmly reinforce the aluminum flange of the well 2. The upper end of the auxiliary casing 17 engages with the under side of the reinforcing plate 20, approximately centrally between the limits of the horizontal portion of the flange. Suitable fastenings 21 are utilized to firmly clamp, but in a removable manner the parts 3 and 20 against and upon the upper end of the casing 1.

The cover or top of the cooker previously referred to as 7 is preferably made of an upper aluminum plate $7^a$ backed underneath by a stout metal plate $7^b$, these plates $7^a$ and $7^b$ being united with a lower aluminum plate $7^c$, backed on its upper side by a stout metal plate $7^d$. The two sets of plates just referred to are suitably spun and pressed together at the interlocking annular rib portions 22. Between the two sets of upper and lower plates just described, I provide thermal insulation such as the mineral wool $7^e$ and there may also be provided a bracing plate 23 for obvious purposes. The top of cover 7 carries the thermometer 24 of a special construction immaterial to this invention and also the steam valve 25. It is clear that the bottom portion of the cover 7 is shaped so as to conform with the shape of the flange 3 of well 2 and the said cover may be hinged or otherwise mounted on casing 1 to readily open and close, suitable locking fastenings not shown, being employed to lock it closed.

From the resistance wires 10 of the heating unit lead wires 26 pass off through openings in auxiliary casings 17 and are properly connected up with a three heat reciprocating switch 27, the construction of which is immaterial to this invention.

It will be evident from the foregoing that should the occasion require, the fastenings 21 may be removed and this will permit of bodily removal of the cooking well 2. After the cover 7 is opened, access may thus be had into the interior of the heating unit. Also the removal of the reinforcing plate 20 permits of removal of mineral wool or thermal insulation 16 so that access may be had to the lead wires 26. Or the heating unit may be bodily removed as required after disconnecting the lead wires 26 from the switch 27. In this manner the body of the cooker may be disassembled, it being notable that it is comprised primarily of a body structure, cooking well, heating element, and cover. Each part is easily removable or accessible in the manner described.

An advantageous feature of the construction above set forth is the provision between the casing 1 and the auxiliary casing 17 of a dead air space having insulation value.

Having thus described my invention, what I claim as new and desire to secure by Letters Patent, is:

1. In a cooker of the class described in combination, a body casing, a permanently attached cooking well disposed therein for receiving a removable vessel or receptacle containing food to be cooked, and a cover the well comprising an aluminum body, and metal reinforcing backing said body in contact therewith.

2. In a cooker of the class described in combination, a body casing, a permanently attached cooking well disposed therein for receiving a removable vessel or receptacle containing food to be cooked, and a cover, the well comprising an aluminum body, and metal reinforcing backing said body in contact therewith, and a heating unit surrounding the well and of which said backing reinforcing is a part.

3. In a cooker of the class described in combination, a body casing, a permanently attached cooking well disposed therein for receiving a removable vessel or receptacle containing food to be cooked, and a cover, the well comprising an aluminum body, and metal reinforcing backing said body in contact therewith, and a heating unit surrounding the well and of which said backing reinforcing is a part, with means for detachably holding the well and casing and heating unit in proper relation so that they may be detached in order to disassemble.

4. In a cooker of the class described, in combination, outer casing, a cooking well disposed therein, and spaced therefrom, thermal insulation between the two, a cover for the well and a heating unit between the outer casing and the well, and comprising a heating body of composition having resistance wire embedded therein, and disposed in contact with the outer surface of the well to reinforce the well at its sides, said well being removable from the casing and from within the heating unit.

5. In a cooker of the class described, in combination, outer casing, a cooking well disposed therein, and spaced therefrom, thermal insulation between the two, a cover for the well and a heating unit between the outer casing and the well, and comprising a metal body reinforcing the well and heating body of composition having resistance wire embedded therein carried by the metal body, and disposed in contact with the outer surface of the well, said well being removable from the casing and from within the heating unit, and said heating unit being likewise removable from the outer casing.

6. In a cooker of the class described, in combination, an outer casing, a cooking well therein and spaced therefrom, a cover for the well, comprising outer plates of aluminum, and inner reinforcing backing plates of stouter metal, a reinforcing backing plate for the well surrounding and in contact therewith, said well being made of aluminum, and thermal insulation between the well and the outer casing, and between the plates of the cover.

7. In a cooker of the class described, an outer casing, an inner auxiliary casing, spaced from the sides and bottom of the outer casing, a well disposed in and spaced from the bottom and sides of the auxiliary casing for receiving a vessel containing matter to be heated, thermal insulation between the sides and the bottom of the well and the sides and bottom of the auxiliary casing, and a cover for the well, the well being made of aluminum and having a flange projecting outwardly from its outer casing and detachably connected with the upper end of the outer casing, metal stouter than aluminum surrounding the well in contact therewith to back and brace same, a reinforcing plate beneath the flange at the top of the well and casing, and extending in contact with the flange so as to reinforce said flange at the points between the well body and the said casing.

8. In a cooker of the class described, in combination, an outer casing, a cooking well disposed therein, and spaced therefrom, thermal insulation between the two, a cover for the well and a heating unit for heating food or other matter placed in the well, and means detachably connecting the well and casing to hold the former in place and permit its removal at will.

9. In a cooker of the class described, in combination, an outer casing, an inner receptacle disposed therein in spaced relation to the outer casing and having a rim about the mouth thereof, means removably connecting the said rim to the top of the outer casing and supportingly sustaining the inner receptacle within the outer casing, and heating means surrounding the inner receptacle within the outer casing.

10. In a cooker of the class described, in combination, an outer casing, an inner receptacle constituting the cooking well disposed therein in spaced relation to the outer casing and having its mouth formed with an outwardly extending flange or lip constituting a seat for the edge of the outer casing, and heating means surrounding the inner receptacle within the walls of the outer casing.

11. In a cooker of the class described, in combination, an outer casing, an inner receptacle constituting the cooking well disposed therein in spaced relation to the outer casing and having its mouth lipped over to engage about the upper edge of the outer casing for support therefrom, and heating means surrounding the inner receptacle within the walls of the outer casing.

In testimony whereof I affix my signature.

HENRY A. ZIOLA.